UNITED STATES PATENT OFFICE.

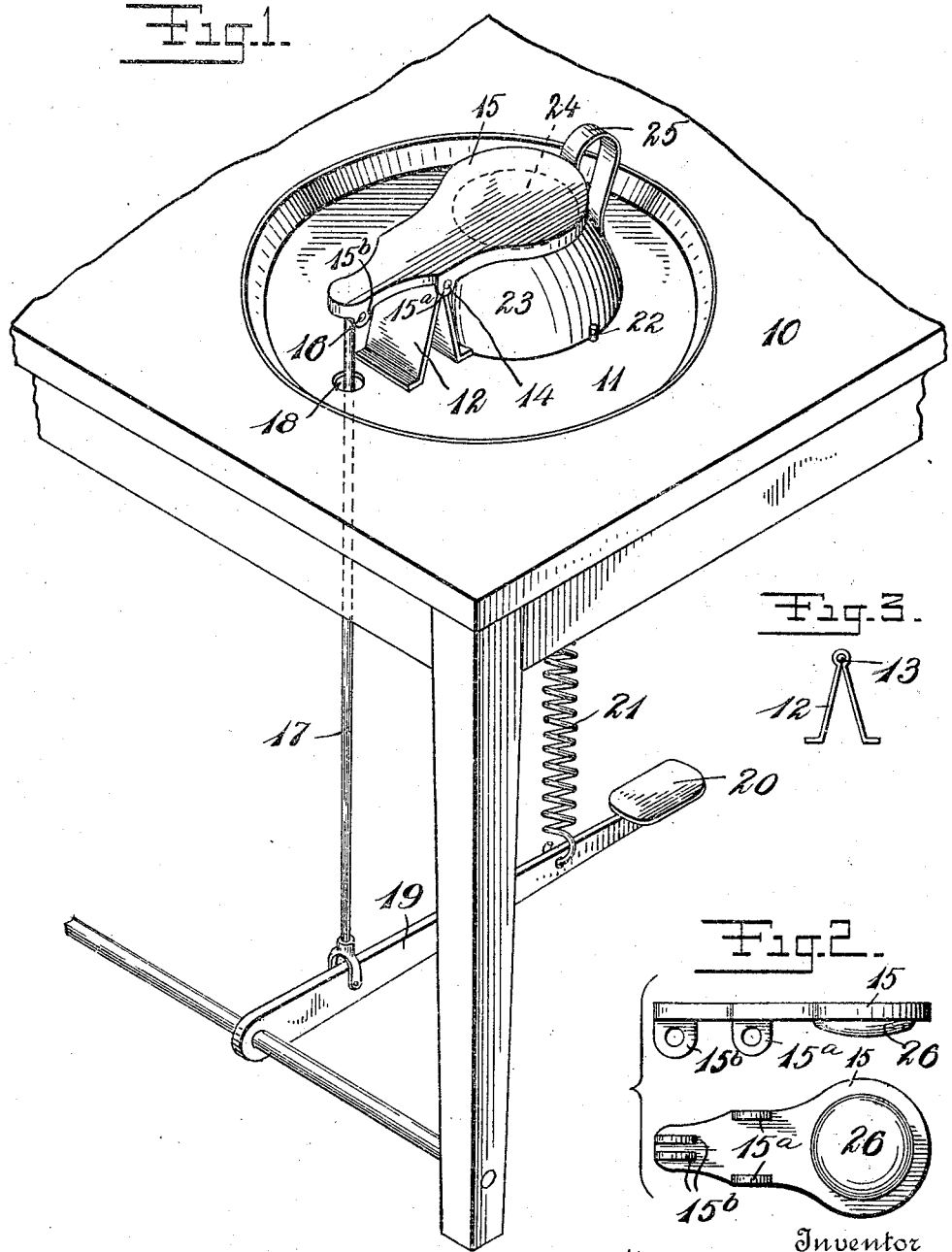

WILLIAM H. McNUTT, OF NEW YORK, N. Y.

RECEPTACLE.

1,277,099.　　　　　Specification of Letters Patent.　　Patented Aug. 27, 1918.

Application filed October 8, 1915. Serial No. 54,709.

*To all whom it may concern:*

Be it known that I, WILLIAM H. McNUTT, a citizen of the United States of America, residing at New York city, in the county and State of New York, have invented certain new and useful Improvements in Receptacles, of which the following is a specification.

In the manufacture of rubber and other products, it is frequently necessary to use rubber cement, gasolene, and other hydrocarbon oils which are highly volatile and subject to rapid evaporation. These substances also give off deleterious fumes which are injurious to the operators in the inclosure where such volatile liquids are used.

Efforts have heretofore been made to provide means for satisfactorily storing and dispensing limited quantities of such substances, but so far as I know there has been no completely satisfactory device produced.

The object of my present invention is to provide a receptacle or vessel in which such volatile liquids may be stored and from which they may be dispensed, and from which, also, the escape of all fumes and the evaporation of liquid will be prevented when the vessel is not in use.

It is a further object of the invention to provide a device of this kind which is simply constructed and the parts of which may be readily assembled and disassembled, thus facilitating packing and shipping as well as cleaning the vessel and replenishing its contents, when needed.

The simplest form of the invention involves an independent receptacle or container for the substance to be used, and a lid having a normal tendency to automatically close the receptacle tightly unless the lid is positively moved and held in a position to give access to the interior of the receptacle.

The invention may be embodied in numerous forms, and for the purpose of disclosing the principle of the invention, I have shown a concrete embodiment thereof in the accompanying drawing in which—

Figure 1 is a perspective view of a portion of a work table upon which is supported my improved receptacle, the lid of the latter being shown as treadle operated;

Fig. 2 is a detail view of the lid shown in side elevation and in underface plan; and Fig. 3 is an elevational view of a pivot support for the lid.

Although I have shown the lid as being treadle operated I desire it to be understood that my invention is not confined to a structure of this kind, but that any suitable means may be used for raising the lid either by foot or by hand, or mechanically, so long as some means is provided for automatically causing the lid to descend on to the receptacle unless it is positively held away therefrom.

Referring to the drawings, 10 denotes a work table which is preferably recessed near a corner thereof to receive the dish or plate 11 upon which my improved device is supported.

Secured to the plate 11 is a pyramid shaped bracket 12 (Fig. 3) which is provided at its apex with a bearing 13 for a pivot or stud 14, about which the lid, designated as a whole by 15, is adapted to revolve freely.

The lid comprises the suitably shaped lid plate proper, as well as the oppositely disposed lugs 15$^a$ at the edges of the intermediate portion of the lid 15. These lugs are perforated so as to permit the passage therethrough of the pivot pin 14.

At its rear or contracted end the lid 15 is provided with parallel perforated lugs 15$^b$ which are adapted to receive a pivot pin 16 engaging the upper end of a rod 17 which passes through an orifice 18 in the plate 11, and has its opposite end forked to engage a treadle 19 carrying at one end the foot plate 20 and being normally drawn toward the table 10 by the coiled spring 21.

Arranged at opposite points on the plate 11 are studs 22 (only one of which appears in the drawing), these studs being designed to frictionally engage the receptacle or container 23 which may be of any form, but which is provided, preferably with a handle 25 and an upper opening 24 of sufficient size to receive the weighted projection 26 formed on the undersurface of the cover 15 near its forward end.

As will be observed, the container 23 is merely held frictionally on the plate 11, and is entirely independent of the cover 15, except when the latter is in such position that the weighted projection 26 enters the opening 24 in the container 23 and practically hermetically seals the latter.

The operation of the device is very simple and is as follows:—When the operator desires to use some of the contents of the receptacle 23 he depresses the treadle 19 thus pulling the rod 17 down and rocking the lid 15 about the pivot 14 whereby the contents of container 23 are exposed. The lid 15 will remain open only so long as the operator keeps his foot on the foot plate 20. Immediately the latter is released, the weight of 26 combined with the balance of the cover 15 forward of the pivot 14 will be sufficient to quickly snap the cover into place over the receptacle. While normally the weight of the cover, as just explained, is sufficient to cause it to close when the treadle 19 is released, I find it desirable to provide a spring 21 as an additional safeguard to draw the treadle 19 upward when the same is released.

If it is desired to clean the receptacle 23 or provide the same with a new supply of liquid, it is merely necessary to draw the receptacle out of engagement with the studs 22, and then return the same to its proper position, after cleaning or filling.

The pivots 14 and 16 being loose in their respective bearings, when it is desired to ship my improved receptacles, these pivots are withdrawn so that the lid and receptacle, as well as the bar 17, are disassembled enabling the device to be packed within a relatively small compass.

It will be understood that the device is susceptible of modification without departing from the spirit of the invention; for example I may use other means for raising the lid from the receptacle, the lid and receptacle may be differently formed, and the pivot support may also be differently formed and the parts differently arranged, so long as the cover automatically tends to drop upon the receptacle unless such cover is positively held away from the receptacle.

What I claim is:—

In a device of the character specified, the combination of a supporting plate, a container adapted to be frictionally held on said plate, a pivot-support comprising legs converging upwardly from said support and having horizontal supporting flanges at their lower ends and an annular bearing above their point of convergence, a lid comprising an enlarged portion adapted to rest on said receptacle, an intermediate portion and a rear contracted portion, depending perforated lugs at the intermediate portion of the lid and adapted to register with said bearing, a pivot pin freely insertible in and withdrawable from said lugs and bearing, and a treadle connection to the rear contracted portion of the lid.

In testimony whereof I have affixed my signature in presence of two witnesses.

WILLIAM H. McNUTT.

Witnesses:
CLARICE FRANCK,
JUDITH PARDEE.

Copies of this patent may be obtained for five cents each, by addressing the "Commissioner of Patents, Washington, D. C."